(12) United States Patent
Lopez et al.

(10) Patent No.: US 7,337,151 B2
(45) Date of Patent: Feb. 26, 2008

(54) AUTOMATED PRICING SYSTEM

(75) Inventors: Douglas D. Lopez, Long Beach, CA (US); Robert L. Klug, Newport Beach, CA (US)

(73) Assignee: California Distribution Center, Inc., Signal Hill, CA (US)

( * ) Notice: Subject to any disclaimer, the term of this patent is extended or adjusted under 35 U.S.C. 154(b) by 691 days.

(21) Appl. No.: 10/346,989

(22) Filed: Jan. 17, 2003

(65) Prior Publication Data
US 2004/0143424 A1  Jul. 22, 2004

(51) Int. Cl.
G06Q 99/00  (2006.01)

(52) U.S. Cl. .................. 705/400; 705/1; 700/97; 703/1; 707/101

(58) Field of Classification Search .......... 705/10, 705/26, 400, 1; 700/96, 97; 703/1; 52/79.1
See application file for complete search history.

(56) References Cited

U.S. PATENT DOCUMENTS

| | | | |
|---|---|---|---|
| 5,189,606 A | 2/1993 | Burns et al. ............... 364/401 |
| 5,307,261 A * | 4/1994 | Maki et al. .................. 705/29 |
| 5,570,292 A * | 10/1996 | Abraham et al. ........... 700/157 |
| 5,761,674 A | 6/1998 | Ito .............................. 707/104 |
| 5,893,082 A | 4/1999 | McCormick ................ 705/400 |
| 5,918,219 A | 6/1999 | Isherwood ................... 705/37 |
| 6,002,855 A * | 12/1999 | Ladner et al. .................. 703/1 |
| 6,038,547 A | 3/2000 | Casto .......................... 705/30 |
| 6,324,508 B1 | 11/2001 | Finney ........................ 704/246 |
| 6,393,410 B1 | 5/2002 | Thompson ................... 705/37 |
| 6,446,053 B1 * | 9/2002 | Elliott ........................ 705/400 |
| 6,810,401 B1 * | 10/2004 | Thompson et al. ......... 707/101 |
| 6,826,516 B1 * | 11/2004 | Ito ................................ 703/1 |
| 6,854,218 B2 * | 2/2005 | Weiss ......................... 52/79.1 |
| 6,859,768 B1 * | 2/2005 | Wakelam et al. ............... 703/1 |
| 2001/0047250 A1 * | 11/2001 | Schuller et al. ................ 703/1 |
| 2001/0047251 A1 * | 11/2001 | Kemp ........................... 703/1 |
| 2002/0026343 A1 | 2/2002 | Duenke |
| 2002/0035408 A1 * | 3/2002 | Smith .......................... 700/97 |
| 2002/0099617 A1 * | 7/2002 | Fogelson ..................... 705/26 |
| 2002/0103557 A1 * | 8/2002 | Land ........................... 700/96 |
| 2003/0050871 A1 | 3/2003 | Broughton |
| 2003/0097240 A1 * | 5/2003 | Atasoy .......................... 703/1 |
| 2003/0139995 A1 * | 7/2003 | Farley .......................... 705/37 |

FOREIGN PATENT DOCUMENTS

JP   2001357075 A   * 12/2001

(Continued)

OTHER PUBLICATIONS

Activewin.com.*

(Continued)

Primary Examiner—John W. Hayes
Assistant Examiner—Freda A. Nelson
(74) Attorney, Agent, or Firm—Roberta L. Hastreiter; Locke, Lord, Bissell & Liddell LLC

(57) ABSTRACT

A method and system are disclosed for automated creation of a pricing schedule comprising steps and an implementation for providing a set of plans created with a software design tool and a palette of parametric symbols corresponding to respective plan elements. At least one symbol corresponding to a plan element is inserted into the plans. A cost value for each of the inserted symbols is calculated corresponding to respective plan elements. A schedule is created including the total cost for all the inserted symbols corresponding to respective plan elements.

2 Claims, 20 Drawing Sheets

FOREIGN PATENT DOCUMENTS

| WO | WO 01/8269 A2 * | 1/2001 |
|---|---|---|
| WO | WO 01/29634 A2 | 4/2001 |
| WO | WO 01/55831 A1 | 8/2001 |
| WO | WO 01/67372 A1 | 9/2001 |
| WO | WO 01/88740 A1 | 11/2001 |
| WO | WO 02/13108 A1 | 2/2002 |
| WO | WO 02/29518 A2 | 4/2002 |
| WO | WO 02/070989 | 9/2002 |
| WO | WO 03/062957 | 7/2003 |

OTHER PUBLICATIONS

Swanson, John G., "E Business Evolving Rapidly", Mar. 2001, Window & Door, 8 pgs.*

"California Distributor Selling Windows On Line", Sep. 2000, Window & Door, 2 pgs.*

EPIC Electronic Product Information Corp, Product Brochures, Apr. 1997.☐☐.*

EPIC Product Information Corp, technology; Software Brochure, May 1992.☐☐.*

EPIC Electronic Product Information Corp., Quick Reference technology Demo, Mar. 1995.☐☐.*

Edgenet Media, Made 2 Order, Brochure, Rev. Jul. 28, 1998.*

EPIC Electronic Product Information Corp, Product Brochures, Apr. 1997.*

EPIC Product Information Corp, technology; Software Brochure, May 1992.*

EPIC Electronic Product Information Corp., Quick Reference technology Demo, Mar. 1995.*

* cited by examiner

Symbol Dragged from list to Drawing

Need new text

Need to delete

*Fig. 18*

☑ Enable this session

Update

View Schedule

*Fig. 19*

Reference Number: 6519035

Select window and door manufacture:
- 1stWindows  $4,277.26
- None

Account Name
tester
Log Out

Change Quote
View Quote
Alter Quote
View All Quotes
Create New Quote
Compare Prices
Elevate a Quote

Current Quote

Name: 1stPricing Reference #6519035

State: California
Change State

Number of Items: 4

Total: $1074.13

*Fig. 26*

Comparison Pricing

| Select Quote | |
|---|---|
| Quote | 1stPricing Reference #3371635 (active) |

Compare Prices

AUTOMATED PRICING SYSTEM

BACKGROUND OF THE INVENTION

In a typical construction design, a set of plans are generated, usually with a computer-implemented tool, such as a CAD (Computer Aided Design) software product. In a separate process, the various elements and materials of the construction project, i.e. windows, doors, skylights, acrylic block are priced out in estimating the cost of the job. This adds time and effort to the process of generating a job quote. Also, since different construction materials of varying quality and cost can be used on a job, the cost amounts on a pricing schedule can vary by a wide margin. Also, in the event that the pricing schedule needs to be changed, i.e. due to cost overruns, competitive bidding or other factors, a new price schedule must be generated, with an additional investment of time and effort involved for each revision. This adds extra expense to a construction project, and this typical process limits the flexibility in selected various construction materials for contractors and end-customers.

SUMMARY OF THE INVENTION

The difficulties and drawbacks associated with previous systems are overcome by the present invention which discloses a method and system for automated creation of a pricing schedule for a construction project. The present invention comprises steps and an implementation for providing a set of construction plans created with a software design tool and a palette of parametric symbols corresponding to respective construction elements. At least one symbol corresponding to a construction element is inserted into the construction plans. A cost value for each of the inserted symbols is calculated corresponding to respective construction elements. A schedule is created including the total cost for all the inserted symbols corresponding to respective construction elements.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

FIG. 18 shows a registration form for registering a new user.

FIG. 19 shows "Scheduler Creation" controls used with the Symbol Palette of the present invention.

FIG. 24 shows a dialog for allowing a user to indicate a type of manufacture, in accordance with the present invention.

FIG. 25 shows an exemplary quote generated in accordance with the present invention.

FIG. 26 shows a highlighted portion of the exemplary quote in accordance with the present invention.

FIG. 27 shows a comparison pricing dialog in accordance with the present invention.

FIG. 28 shows a comparison quote generated in accordance with the present invention.

FIGS. 29-33 show various dialogs in connection with the check out process in accordance with the present invention.

DETAILED DESCRIPTION OF THE INVENTION

Figure 1:
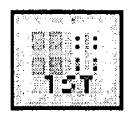
FIG. 1 is a depiction of an activation button added to a software toolbar in accordance with the present invention.

The present invention is directed to an automated pricing system where a pricing schedule for a product is generated and inserted directly into a set of project plans. For example, in the preferred embodiment, the product can be construction materials, i.e. windows, doors, acrylic block, skylights, etc. is inset into a construction plan. Of course, it is to be understood that any number of product types can be employed, and any other different symbols can be employed in a different embodiment other than construction materials, without departing from the present invention. The description that follows, with particular applicability to construction materials, should be regarded as exemplary and not limiting.

The present invention is preferably implemented as a plug-in (or add-on) component working within the CAD (Computer Aided Design) software product. Each window, door, skylight, or acrylic block is inset into the building plans via parametric symbols. Each symbol adds a combined two-dimensional/three-dimensional representation of the associated construction element product to the plans. A cost value is calculated for each construction element and total cost is calculated for the entire set of construction elements. A schedule is created and inset into the plans. The schedule contains a detailed list of the construction element products with the attached pricing for the total cost value. The schedule can also be exported as a standalone object in the form of various common formats including but not limited to Excel, Word, Plain Text, HTML, XML, etc. Pricing is determined via a connection between the plan drawer's local computer system and a database maintained on a remote system. Product data passes from the plan drawer's local computer to the database, and pricing data passes back to the plan drawer's computer. The system may be implemented over the Internet, LAN, physical storage medium CD, DVD, etc The basic steps of a practical implementation of the invention are laid out herewith. Detailed explanations and step-by-step processes will be set forth in detail in associated sections below. An initial step would be to install CAD (Computer Aided Design) software on a plan drawer's local computer system. The Plug-In installation files of the present implementation are preferably installed during the basic installation of the CAD software. Alternatively, the plug-in installation files of the present implementation can be installed after installation of the CAD software and would be acquired, either from a physical storage medium (e.g. a compact disc) or by download from a remote server. (See the section below on "Installation.") The CAD software is then started. An existing CAD Drawing is then opened, or a new set of plans is created using the "wall tool." (See the section below on "Interacting with the wall tool.") The Symbol Palette is activated. (See the section below on "Activation.") In an embodiment where a database is maintained on a remote system, a connection is activated, e.g. an Internet connection. For a first-time user accessing the remote database, a ZIP code may be entered to obtain pricing for the project, since the price of the selected items can vary with the geographical location of the project. Alternatively, a schedule can also be generated without ZIP code data. A symbol is clicked and entry made of specific parameters that make up the symbol and then it is inserted into the plans. (See the section below on "Symbols.") From there, the symbol's parameters can be modified as necessary. (See the section below on "Symbol Properties.") The latter two steps can be repeated to establish the desired placement of the construction elements for the project. Afterwards, a schedule is created. (See the section below on "Scheduler Creation Controls.") The symbols can be revised, added, deleted, modified or edited as the project requires. The schedule can then be updated. The schedule is transmitted over the Internet connection, Lan, external storage device, etc. into a database. The information is then sent back to the CAD drawing reflecting the new changes and a schedule reference number. This schedule reference number can be entered into a database (See the section below on "Online Operations") to retrieve pricing information upon which the building products listed in the schedule can then be purchased.

Installation

Installation of the add-on component to the local system is accomplished via a set of installation files. These files may be part of the CAD installation program or accessed from a CD, LAN, WAN, Intranet, Internet or any other such medium. The installation procedure requires the running of a Setup.exe (executable file) preferably using standard Windows™ OS methodology, although the invention can also be implemented using Mac, Linuxor any other type of operating system. It is contemplated to include an opening advertisement popup to the CAD software, promoting the proprietary product of the present invention. This popup appears each time CAD is started. Selecting a checkbox imbedded within the popup will deactivate it.

The application of the present invention runs as a plug-in, a set of code that is designed to run within a parent application as an internal component. The present application is designed to run within CAD.

Installation of the plug-in places "symbols" files and associated data files onto the computer where the plug-in is installed. The symbols depict popular configurations of common products, preferably construction elements such as window and door types. In the preferred embodiment, three types of symbols are provided: Windows, Doors and Acrylic Glass Block. The installation also adds the following controls to the CAD software: an "activation" button is added to the main toolbar as shown in FIG. 1; a menu item labeled "1st Pricing" (corresponding to the proprietary product of the present invention) is added in the "View" menu; and a "1st Pricing" palette is added to the CAD palettes.

Data Flow

Figure 2:
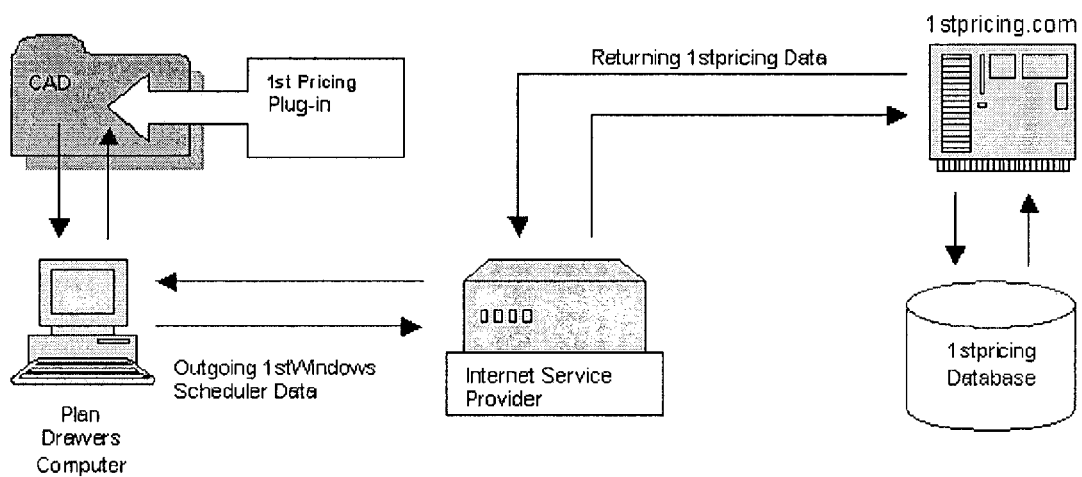
FIG. 2 is a flow chart depicting the basic data interaction between the plug-in and online database in accordance with the present invention.

FIG. 2 shows the basic data interaction between the plug-in of the present invention and the corresponding online database of the present invention. The plug-in of the present invention operating within CAD sends outgoing data corresponding to all of the information on the symbols that are imbedded within the plans. The outgoing data is preferably sent from the user's local computer system over the Internet via the user's ISP to a proprietary web site on a remote server system implementing proprietary software and a database in accordance with the present invention. The software at the site compares the user's information with the database to determine appropriate prices for the products represented by the symbols. The proprietary web site then returns the pricing data over the Internet to the user's local computer system. The present plug-in receives the pricing data, generates a schedule, and imbeds the schedule with the pricing in the CAD drawing.

Symbol Palette

Figures 3, 4:
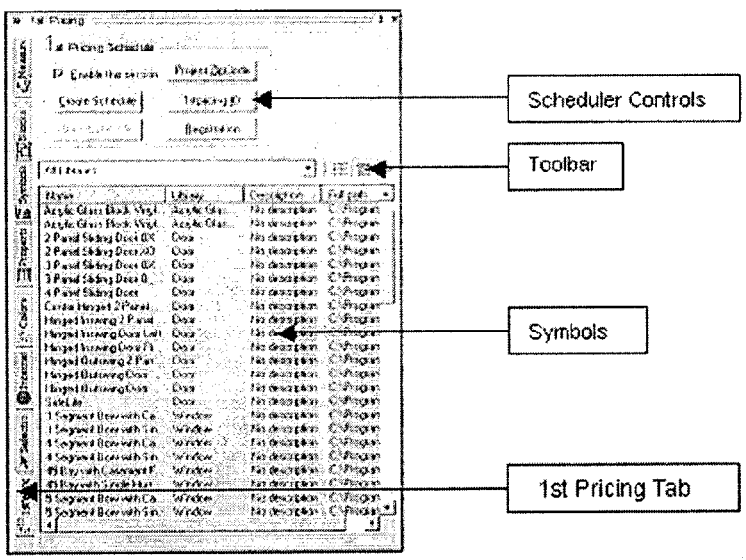
FIG. 3 depicts the Symbol Palette used with the present invention.
FIG. 4 shows the symbol details of the present Symbol Palette.

As shown in FIG. 3, the Symbol Palette of the present invention includes a set of controls and a list of symbols. The controls are divided into two groups: a toolbar; and scheduler controls. In the disclosed embodiment, the symbols are preferably organized into three groups or libraries: windows, doors, and acrylic glass blocks Activation The Symbol Palette cannot be used until it is activated. Clicking the activation button or menu item will launch the Symbol Palette. After installation the Symbol Palette is launched by default. To activate the Symbol Palette: click the "1st Pricing activation" button; or select "View/1st Pricing" from the menu; or click the "1st Pricing" Tab in the CAD palette.

Toolbar

Figure 5:
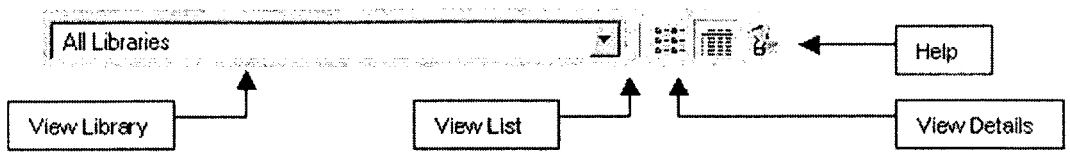
FIG. 5 shows the toolbar of the present Symbol Palette.

In the preferred embodiment as shown in FIG. 5, the Toolbar consist of four controls, one drop down menu, and three buttons. The controls are as follows:

A "View Library" drop down menu allows the user to arrange the list of symbols to display a specific type (Windows, Doors, Skylights, Acrylic Glass Block, etc) or to view all of the symbols by selecting the "All Libraries" option.

A "View List" button allows the user to set the symbols list so that only the symbols names appear.

A "View Details" button allows the user to set the symbols list so that each symbol is listed with four details as shown in FIG. 4: Name, Library, Description and Full Path. The symbols are listed vertically with the detail organized in four columns horizontally. When this option is selected an additional control button is appended to the top of each of the detail columns. Clicking on any of these buttons reorders the symbols list alphabetically by the detail of the associated column contains.

A "View Help" button allows the user to open the "1st Pricing" help system.

Symbols

Figure 6:
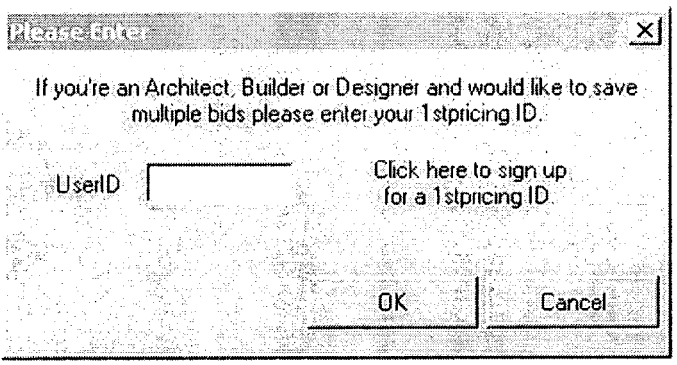
FIG. 6 shows a User ID dialog used with the present invention.
Figure 8:
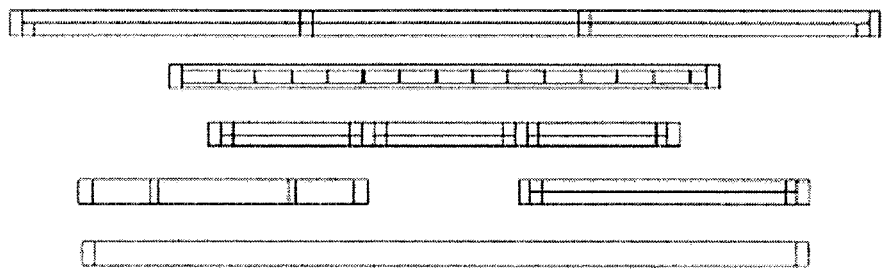
FIGS. 8 and 9 respectively show two and three dimensional representations of the symbols used with the present invention.
Figure 9:
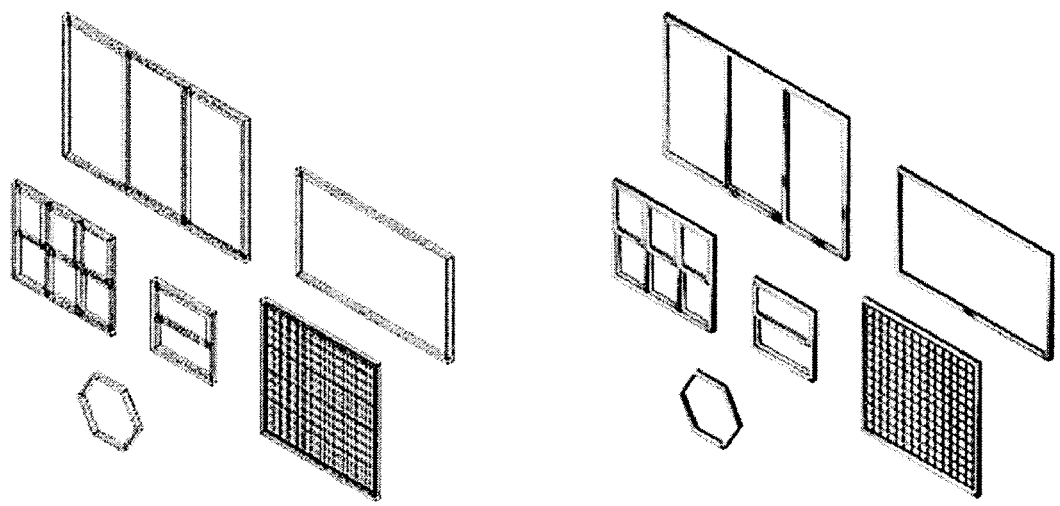

The set of symbols are preferably provided to represent the majority of possible options generally available to a user of the system of the present invention. Each symbol has unique aspects and attributes and is a combination of two CAD objects: a two-dimensional representation and a three dimensional representation (as shown respectively in FIGS. 8 and 9). The symbols are designed to interact with the "CAD Wall Tool." Symbols are inserted into the plans by clicking on the symbol from the list in the "1st Pricing" Symbol Palette and then moving it into the drawing. The symbol automatically aligns itself with the orientation of the wall showing a preview of the symbol prior to placing the symbol within the drawing. When a symbol is moved into the plan a "1st Pricing Symbol Properties" dialog appears. The properties dialog allows the parametric values to be specified for the inserted symbol. Parametric values can include any size or material specification for a given item, including a standard product item number for a respective construction element. In a new drawing, as shown in FIG. 6, the User ID dialog appears when the first symbol is inserted if an ID has not been entered. The properties dialog may be recalled to edit the parametric values for any symbol already in the plans. Selecting a symbol and clicking the right mouse button will open a local menu. Selecting the "1st Pricing Properties" option from the local menu will open the properties dialog for the symbol.

Figure 7:
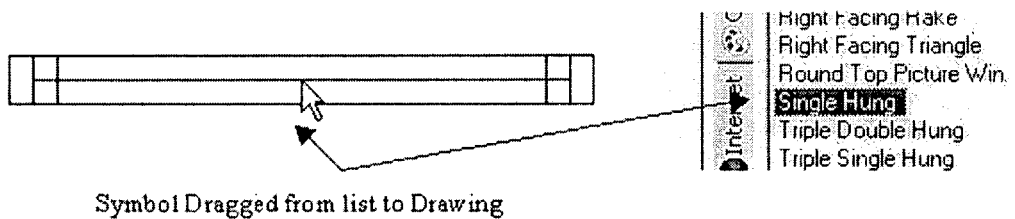
FIG. 7 illustrates an operation for inserting symbols with the present invention.

To insert a symbol, the symbol is clicked and entry is made of specific parameters that make up the symbol and then inserted into the plans. Operation can be employed, as shown in FIG. 7. Click on the symbol and move the symbol to the location in the plans where it is to be inserted and release the button. Modify the properties in the "Properties" dialog as necessary. When the symbol is placed and modified as required, the user clicks "OK."

Symbol Properties

Each type of symbol corresponding to a product item, such as a construction element (e.g. Windows, Doors, Acrylic Glass Block) has a unique set of parametric attributes (properties) that may be specified for the symbol. In addition each specific symbol has a unique range of values that are permissible for those attributes. Symbol properties may only be edited by using the properties dialog. To edit the symbol properties, select the symbol to be modified and click the right mouse button. Select 1st Pricing Properties from the local menu. Modify the properties in the Properties dialog as necessary. When the properties are modified as required, the user clicks "OK."

General Properties

Figure 10:
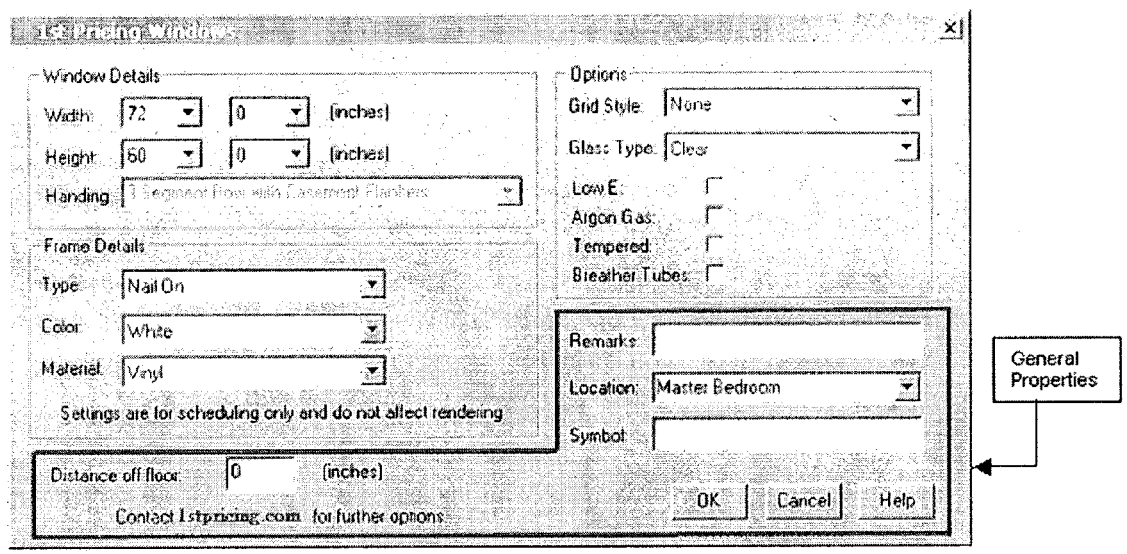
FIG. 10 shows a portion of a dialog for specifying general properties of a symbol.

As shown in FIG. 10, general properties are available for all symbol types. The parametric controls available as general properties are indicated as follows. The "symbol" text box field allows the user to notate individual symbols. The "location" text box field allows the user to notate the physical location of the symbol in the plans (e.g. bedroom, kitchen, etc.) The "remarks" text box field allows the user to make special notations about the symbol. The "distance off floor" field allows the user to specify a measurement value that specifies where the bottom of the symbol is set in relation to floor. The plug-in of the present invention also includes an implementation wherein, upon insertion of a symbol, whether or not the location of that symbol meets the criteria of a building code.

The properties dialog also contains three buttons that are present for all symbols. These buttons are as follows: Clicking the "OK" button accepts the symbol configuration, closes the properties dialog, and makes the appropriate changes in the plans. Clicking "cancel" will close the properties dialog, and ignore any changes made to symbol properties. The "help" button allows the user to open the "1st Pricing" help system.

Windows Properties

Figure 11:
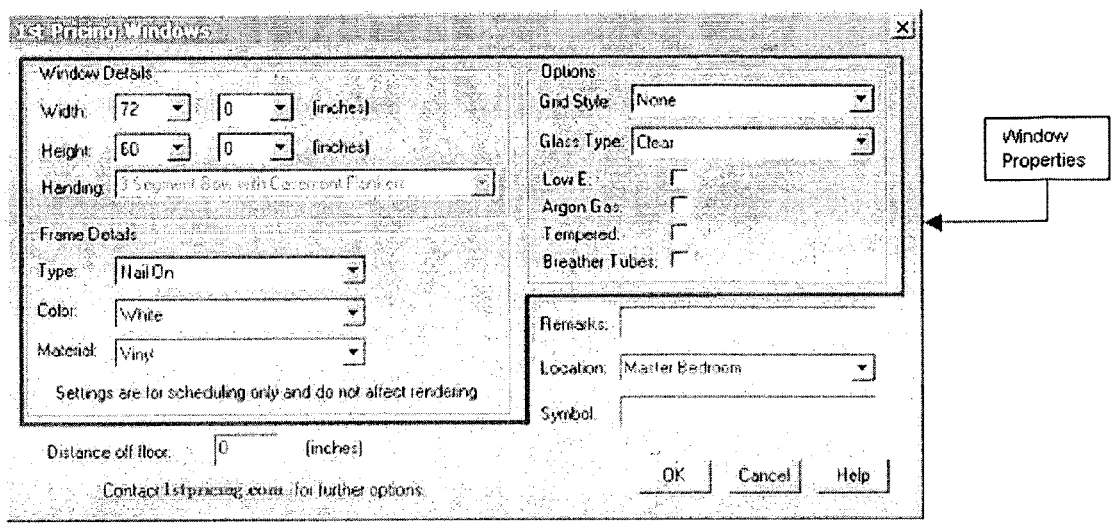
FIGS. 11, 12 and 13 respectively depict portions of respective dialogs for specifying attributes of particular symbol types.

As shown in FIG. 11, windows properties are specific attributes that pertain specifically to windows. Specific ranges/options may vary for each symbol. There are three classifications: Window details, Frame details and Options.

Window Details:

The "Width" drop down menus are used to select width in inches and fractional inch increments. The "Height" drop down menus are used to select the height in inches and fractional inch increment. The "Handing" drop down menus are used to select the handing (right or left) type where applicable.

Frame Details:

The "Type" drop down menu is used to select the window frame type. The "Color" drop down menu is used to select the frame color. The "Material" drop down menu is used to select the composition of window frame.

Options:

The "Grid Style" drop down menu is used to select the desired grid pattern. The proprietary program will automatically calculate the grid frequency based upon the size of the window. The "Glass Type" drop down menu is used to select the desired glass type. The "Low E" drop down menu is used to select Low Emissive coating on glass. The "Argon Gas" check box is used to select Argon Gas filled glass. The "Tempered" check box is used to select Tempered Glass. The "Breather Tubes" check box is used to select breather tubes.

Acrylic Glass Block Properties

Figure 12:
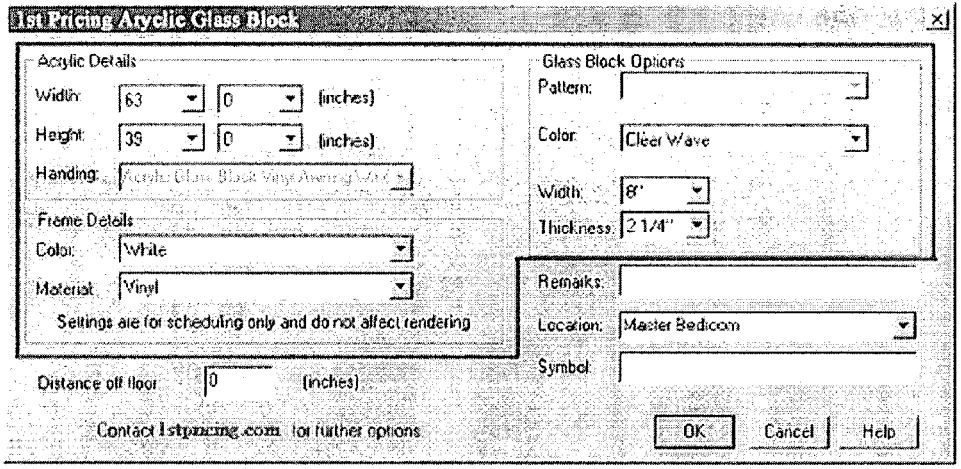

As shown in FIG. 12, Acrylic Glass Block properties are specific attributes that pertain specifically to acrylic glass blocks. Specific ranges/options may vary for each symbol. There are three classifications: Acrylic Glass Block details, Frame details and Options.

Acrylic Glass Block Details:

The "Width" drop down menus are used to select width in inches and fractional inch increments. The "Height" drop down menus are used to select the height in inches and fractional inch increment. The "Handing" drop down menus are used to select the handing (right or left) type where applicable.

Frame Details:

The "Color" drop down menu is used to select the frame color. The "Material" drop down menu is use to select the composition of window frame.

Glass Block Options:

The "Pattern" drop down menu is used to select the block pattern. The "Color" drop down menu is used to select the block color. The "Width" drop down menu is used to select the block width. The "Thickness" drop down menu is used to select the block thickness.

Door Properties

Figure 13:
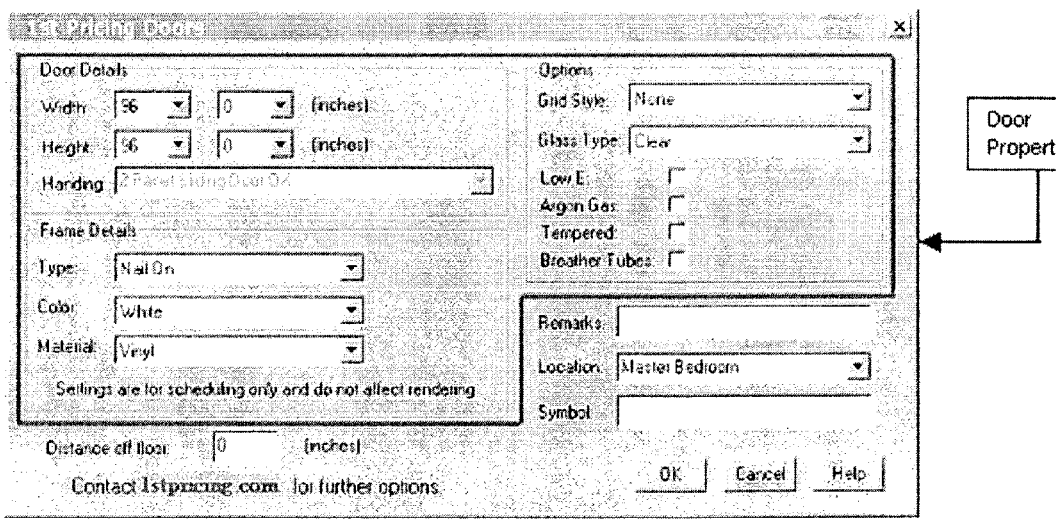

As shown in FIG. 13, door properties are specific attributes that pertain specifically to doors. Specific ranges/options may vary for each symbol. There are three classifications: Door details, Frame details and Options.

Door Details:

The "Width" drop down menus are used to select width in inches and fractional inch increments. The "Height" drop down menus are used to select the height in inches and fractional inch increment. The "Handing" drop down menus are used to select the handing (right or left) type where applicable.

Frame Details:

The "Type" drop down menu is used to select the door frame type. The "Color" drop down menu is used to select the frame color. The "Material" drop down menu is used to select the composition of door frame.

Options:

The "Grid Style" drop down menu is used to select the desired grid pattern. The proprietary "1st windows" software will automatically calculate the grid frequency based upon the size of the door. The "Glass Type" drop down menu is used to select the desired glass type. The "Low E" drop down menu is used to select Low Emissive coating on glass. The "Argon Gas" check box is used to select Argon Gas filled glass. The "Tempered" check box is used to select Tempered Glass. The "Breather Tubes" check box is used to select breather tubes.

Scheduler Controls

Figures 14, 15:
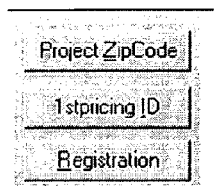
FIG. 14 depicts "Scheduler Controls" used with the Symbol Palette of the present invention.
FIG. 15 depicts the "Registration" dialog opened upon actuation of the "Registration" scheduler control button.

As shown in FIG. 14, the scheduler controls of the proprietary software implementation of the present invention are used to create and maintain the schedule that is generated using the symbol data contained in the plan. A schedule is a detailed part list of the symbols contained in the plans with appended pricing data. The scheduler of the present invention uses an Internet connection to access the pricing data. If no Internet connection is present, an open schedule may be generated but the pricing data will be absent. Only one piece of data is required for the pricing portion of the scheduler to work, a ZIP code for the project. One control accessable from different paths in the scheduler are used to input this data.

Scheduler Data Controls

The three Scheduler Data controls are used to update the present scheduler for accurate operation.

The "Registration" button: For new users, clicking the "Registration" button opens the registration dialog shown in FIG. 15. Completing the form registers the proprietary software. An active Internet connection is required for this to work. The dialog provides the following controls for entering data: a "First Name" text box (mandatory); a "Last Name" text box (mandatory); a "Company Name" text box; an "Address" text box; a "City" text box; a "State" drop down menu; a "Postal Code" text box; a "Phone" text box; a "Fax" text box; an "Email" text box (mandatory) and an "Email me about updates and special offers" check box. To Register the present Plug-in, the user then clicks the "Registration" button, fills out the registration form as indicated above and clicks "OK." A confirmation notification is also sent to the user electronically (via internet, Lan, etc.) or physically (snail mail, fax, etc) containing user information.

Figure 16:
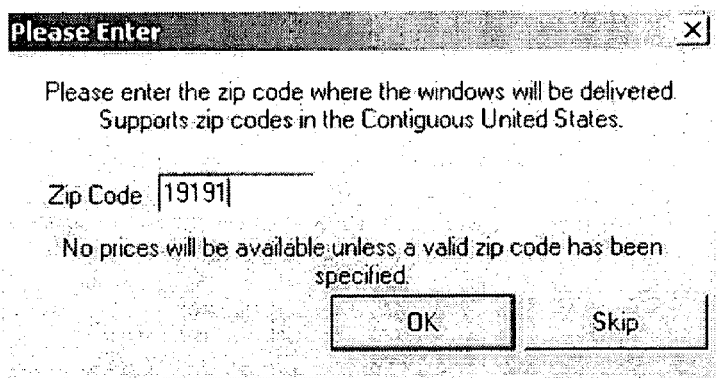
FIG. 16 depicts the "Zip Code" dialog opened upon actuation of the "Zip Code" scheduler control button.

The "Project ZIP Code" button: Clicking the "Project ZIP Code" button opens the ZIP Code dialog shown in FIG. 16. This dialog is used to enter the job site's physical zip code that is used to obtain accurate price quotation. The dialog provides two buttons, "OK," and "Skip." Selecting "OK" enters the ZIP code into the scheduler. Pressing "Skip" will cause changes to be ignored, and the user will be prompted that a correct ZIP code is required for accurate pricing. To set the project ZIP code: click the "Project ZIP Code" button; enter the correct ZIP code; and click "OK."

Figure 17:
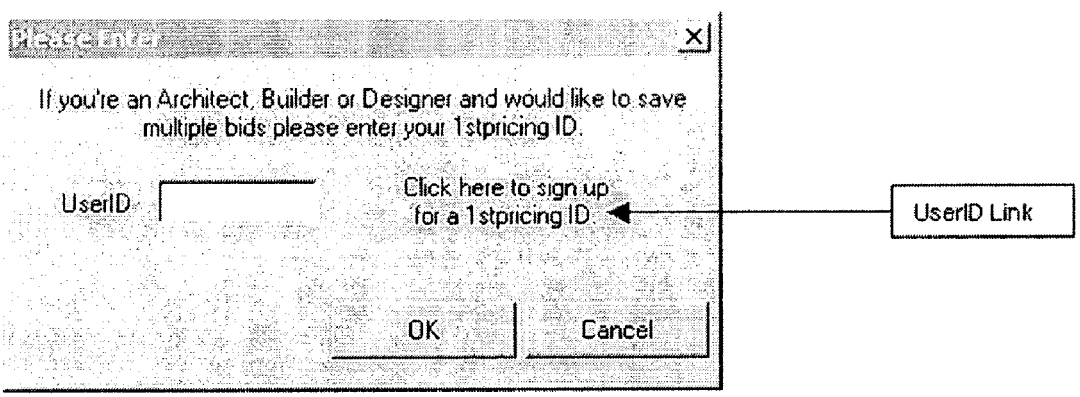
FIG. 17 depicts the "User ID" dialog opened upon actuation of the "Zip Code" scheduler control button.

The "1$^{st}$ Pricing ID" button: Clicking this button opens the "User ID" dialog show in FIG. 17. This dialog provides the following four controls: A "User ID" text box field is used to enter the "1st Pricing ID." Registration dialog—FIG. 15 A "Click here to sign up for a 1st Pricing ID" takes the user to the "1st Pricing ID" registration dialog box (FIG. 15). An active Internet connection must be present. The Registration dialog form must be filled out and submitted to generate a User ID. The User ID will be whatever the user specifies as the User Name on the form. Registration creates an online account at the proprietary "1$^{st}$ Pricing" web site that can be used for reviewing, placing orders and comparison-shopping amongst manufacturers. Clicking the "OK" button set the User ID and closes the dialog. The user is then sent his user name and password information electronically via Internet, email, LAN, etc. or physically via fax, "snail mail," etc. Clicking the "Cancel" button closes the dialog.

To set the User ID as indicated above, the user clicks the "1st pricing ID" button, enters the User ID, and clicks "OK." To register, the user clicks the 1st pricing ID button. The "Click here to sign up for a 1st Pricing ID" link is then clicked and the "Registration" dialog box is opened (FIG. 15). The User ID will be whatever is selected as the User Name on the form. The "Submit" button is then clicked.

Scheduler Creation Controls

The "Scheduler Creation" controls shown in FIG. 19 enable the creation, updating, and viewing of the schedule. The "Enable this session" check box allows the plug-in to connect to the 1stWindows/1stPricing's proprietary web database to obtain pricing data. If this box is not checked the scheduler will not access the database, and the schedule will be generated without pricing data.

"Create Schedule" Button

Figures 20, 21:
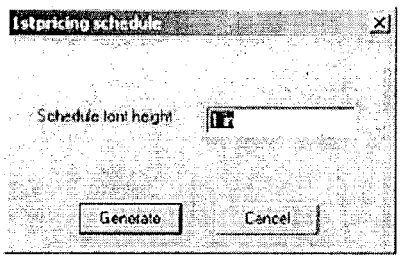
FIG. 20 shows a schedule dialog used to generate a schedule in accordance with the present invention.
FIG. 21 shows details of the schedule as generated in accordance with the present invention.

If no schedule exists this button will be labeled "Create." Clicking this button will open the "1st pricing" schedule dialog shown in FIG. 20. This dialog is used to generate the schedule based from the symbols inserted into the plan. The dialog also prompts the user for the size of font to be used in the schedule. The size of the schedule depends on the font size used and the scale settings in CAD. If a schedule exists the user will see a button labeled "Update" instead of "Create." Using the Update button will change the schedule according to symbol changes made since the creation of the last update. In all other respects the procedure is the same as using the Create button. When the schedule is generated all of the schedule information is saved at the proprietary 1stWindows web site and can be accessed by using the 1stWindows/1stPricing ID. When the session is enabled and there is an open Internet connection a reference number is appended to the schedule. This number can be used to retrieve the schedule quotation at the 1stWindows web site. Some products may not be available in the area designated by the ZIP code. In such an instance pricing is not always listed for all of the inserted symbols. In such a case an "N/A" designation is placed in the schedule. To create/update a schedule as indicated above, the "Create" button is clicked, a schedule font height is typed in, with a "Generate" button and "Export" button. If the Generate button is clicked a schedule is created, if a user clicks the "Export Button" the user is asked the file format (Excel, Plain Text, Word, etc) and asked where to save the file on his computer.

"View Schedule" Button

Clicking the "View Schedule" button will zoom to the part of the drawing where the schedule has been inserted. If the symbols have been altered without updating the schedule a message will be appended that reads "Schedule may not reflect the window specifications."

The Schedule

In the schedule as shown in FIG. 21 unique symbols are listed vertically. Details for each symbol are organized horizontally under the following columns: Symbol, Location, Width, Height, Handing, Color, Type, Material, Grid Style, Low E, Argon Gas, Tempered, Breather Tubes, Glass, Glazing, Remarks, Quantity, and 1stWindows (pricing).

Interacting with the Wall Tool

Figure 22:
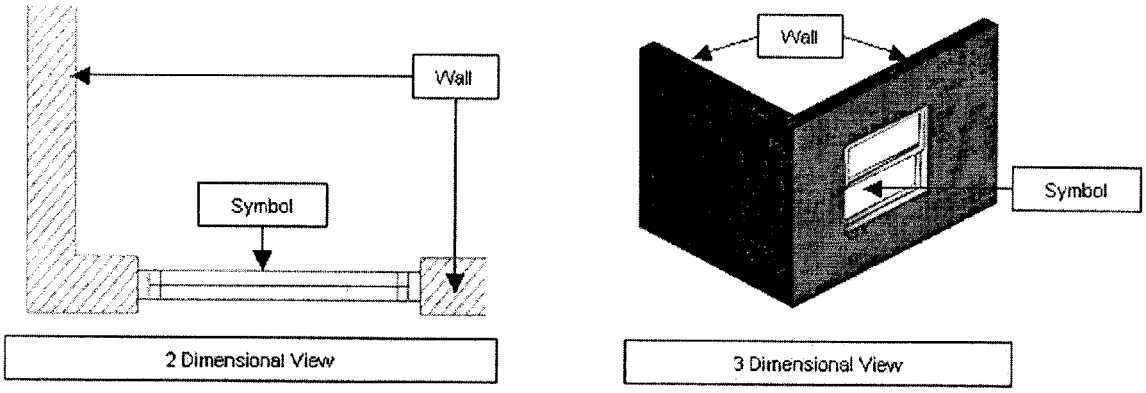
FIG. 22 shows symbols embedded into walls in accordance with the present invention.

The proprietary symbols will auto-imbed into wall depictions created with the CAD Wall tool as shown in the two-dimensional and three-dimensional depictions of FIG. 22. A symbol can be moved onto a wall. The symbol will automatically align with the wall and auto-embed into it. Appropriate cutouts will be made in the wall for the symbol, and the wall will "heal" around the symbol. To insert a symbol in a wall, the symbol is clicked and entry made of specific parameters that make up the symbol and then insert it into the plans. The properties can be modified in the Properties dialog as necessary. Afterwards, the user clicks "OK."

Online Operations

Figure 23:
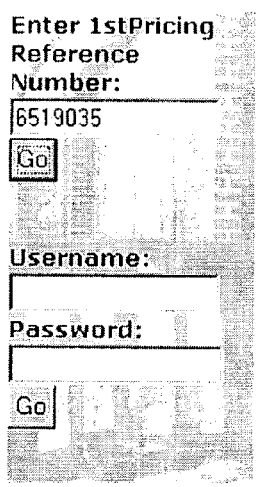
FIG. 23 shows a login screen including a schedule reference number in accordance with the present invention.
Figures 24, 25:
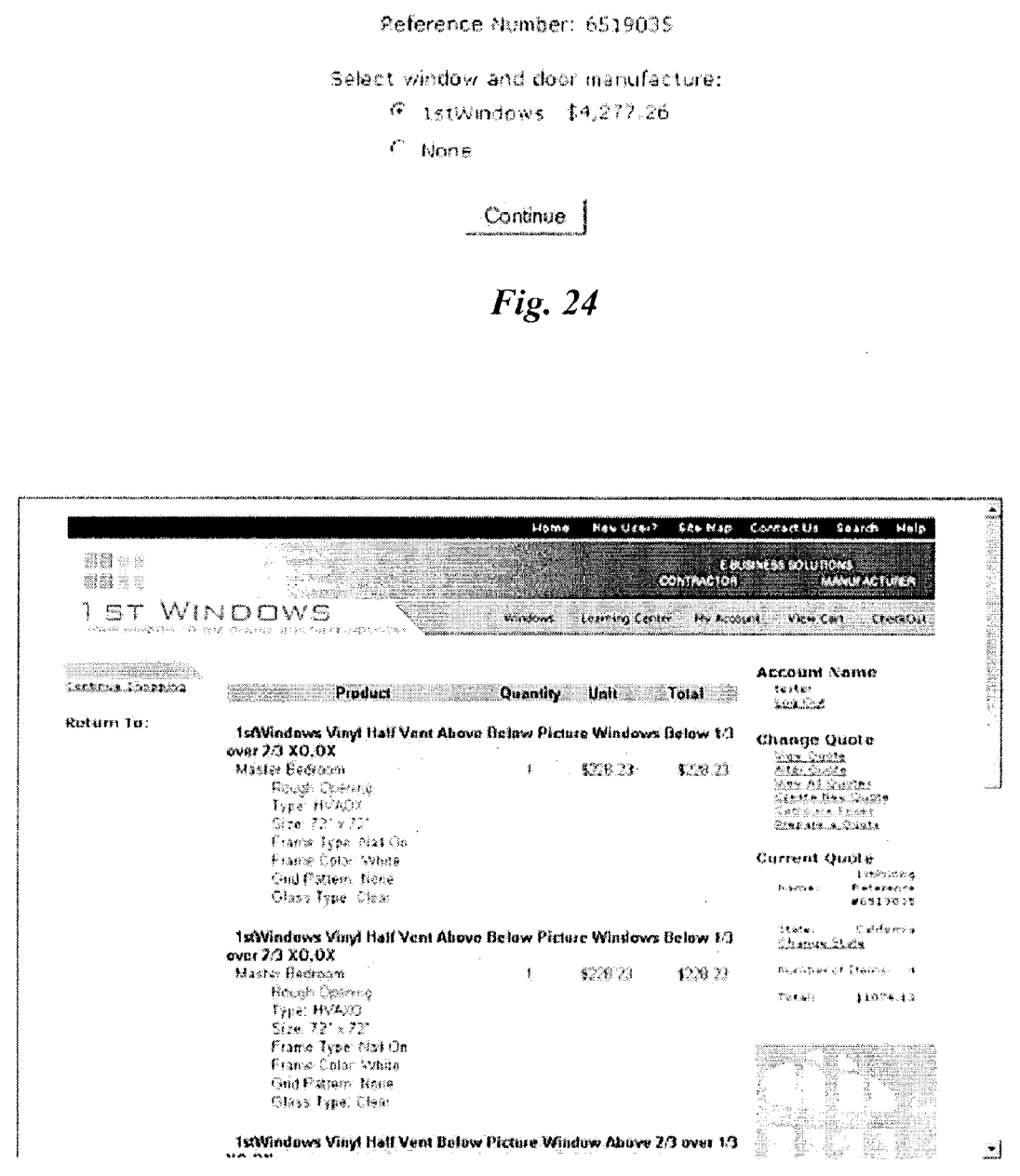

As shown in FIG. 23, the reference number listed on a "1stWindows Scheduler™" is the name of a quote. The reference number may be used on the proprietary 1stWindows web site to access pricing data for that schedule. Using the reference number will automatically log the user onto the web site. Quotes may also be reviewed by logging to the 1stWindows web site using the User ID and Password that was created during registration. This will provide access to the "My Account" area of the web site. The account will contain all of the schedules generated by the registered user. Once a reference number has been specified the user may select the type of manufacturer as shown in FIG. 24. A quote will then be presented to the User as shown in the example of FIG. 25.

When a user has logged on and provided the reference number, the user is provided with the list of windows that appear on the schedule. Clicking the view quote button will yield the same result at any time. If a quote needs to be changed, the user can click the alter quote button (as shown in FIG. 26) and change the size or options for or all the products specified.

Figure 28:
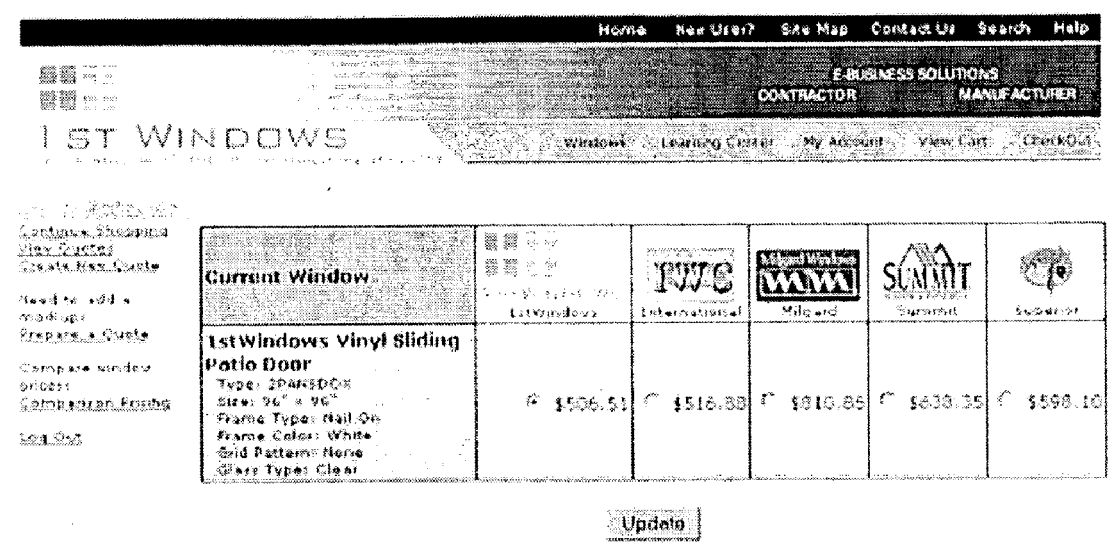

Another example of the extended options with the proprietary 1stpricing is comparison-shopping. As shown in FIG. 27, a user can select a quote and generate a comparison of pricing between available manufacturers. The product "1stWindows Vinyl Sliding Patio Door" is delineated in FIG. 28 and the same product and configuration's price is listed in the columns to the left. The above example features price quotes from International, Milgard, Summit and Superior. If another manufacturer's product is to be substituted the user simply clicks on the radio button next to the price. The quote will then be amended and that manufacturers product will appear in the quote.

Completing and Purchasing the Order

Figure 29:
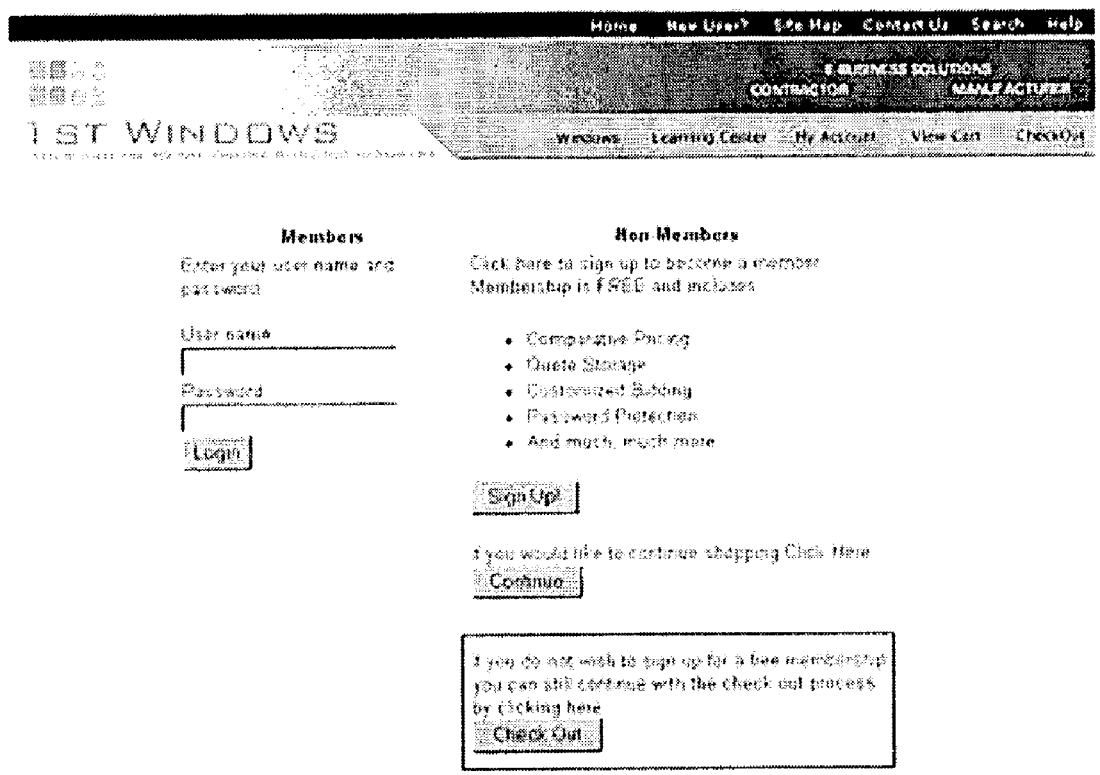
Figure 30:
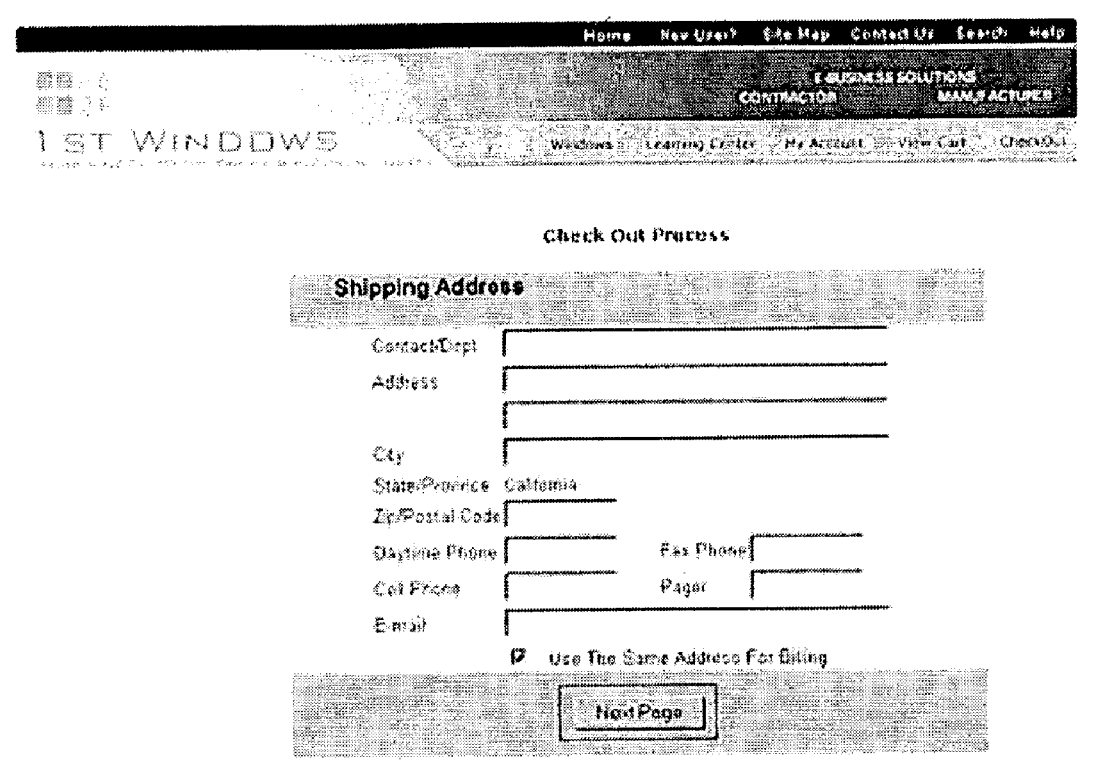

Once the quote is completed and verified by the user, the user proceeds to the check out process to purchase the desired products. To begin the check out process, the user clicks the "Check Out" button. If the user either is not a registered user or is a registered user but not logged into the suitable user account, the user will be redirected to the page indicated in FIG. 29. The user either logs in or, if not a member, just clicks the "Check Out" button at the bottom of the Non-Member column. A "ship-to address information" dialog is displayed, as shown in FIG. 30. The desired shipping information is entered in the fields provided. If the "ship to" address and billing address are the same, the user clicks the "Use The Same Address For Billing" box. If a separate billing address is required, the user leaves the box unchecked. The "Next Page" button is clicked and a page will be provided to enter the billing address information. When completed the "Next Page" button is clicked.

Figure 31:
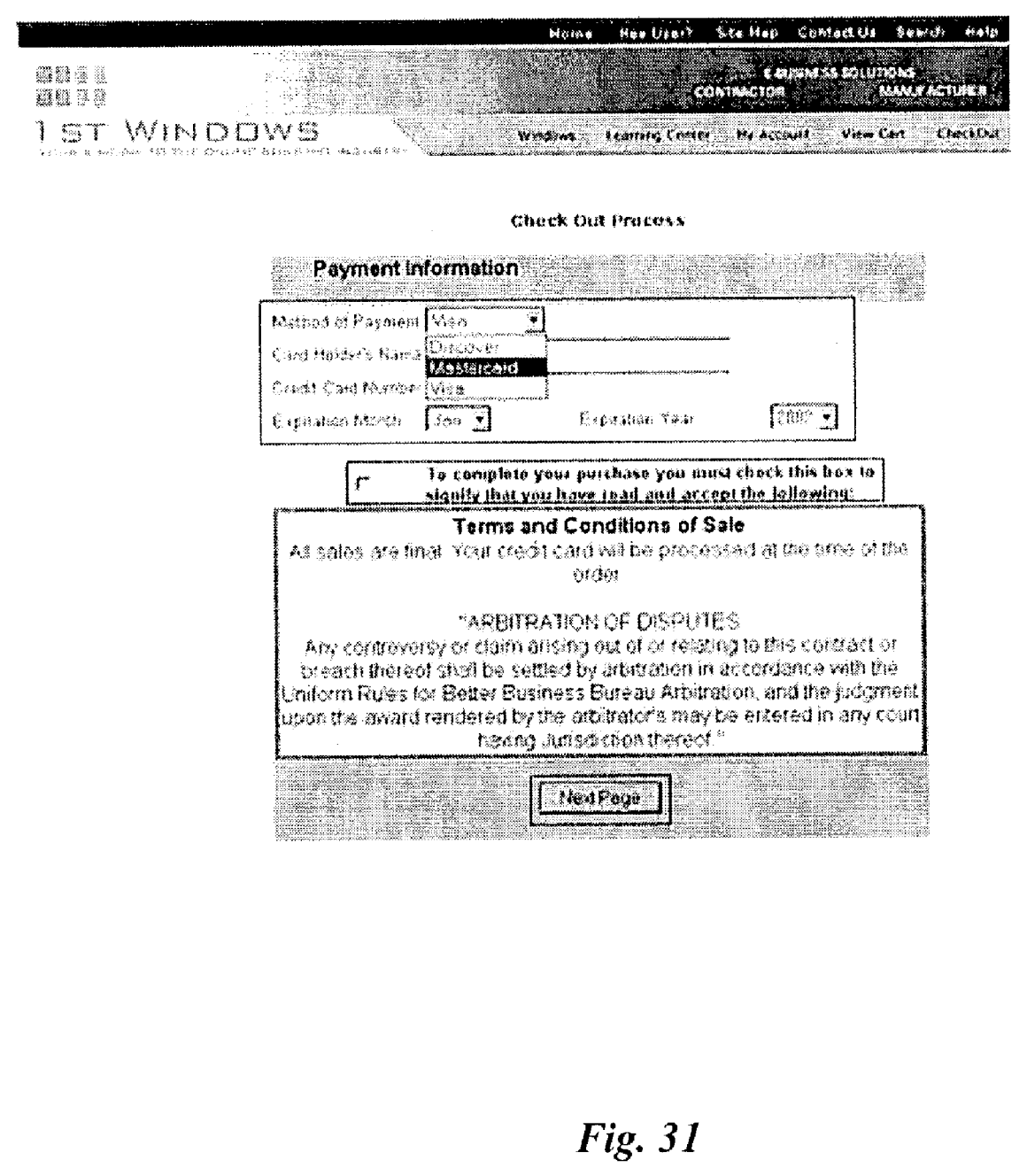

In a second step in the check out process, payment information is entered in the fields of a dialog provided as shown in FIG. 31. The user reads the "Terms and Conditions of Sales" policy, clicks the box next to the acceptance policy to check it, and clicks the "Next Page" button. The proprietary web site preferably accepts Visa, Mastercard and Discover Card and all credit card information is transmitted via secure server. The "Next Page" button is clicked to proceed.

Figure 32:
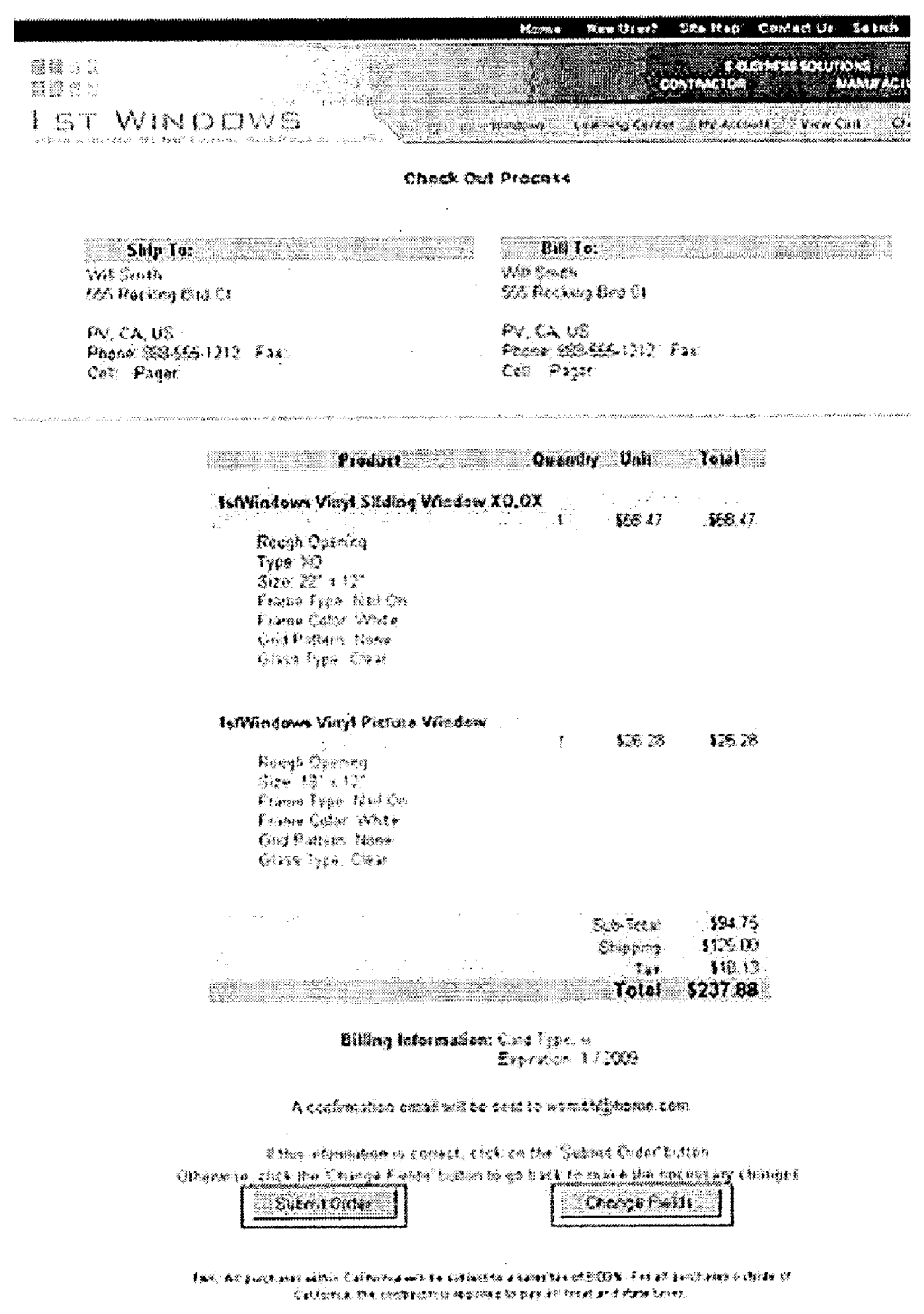
Figure 33:
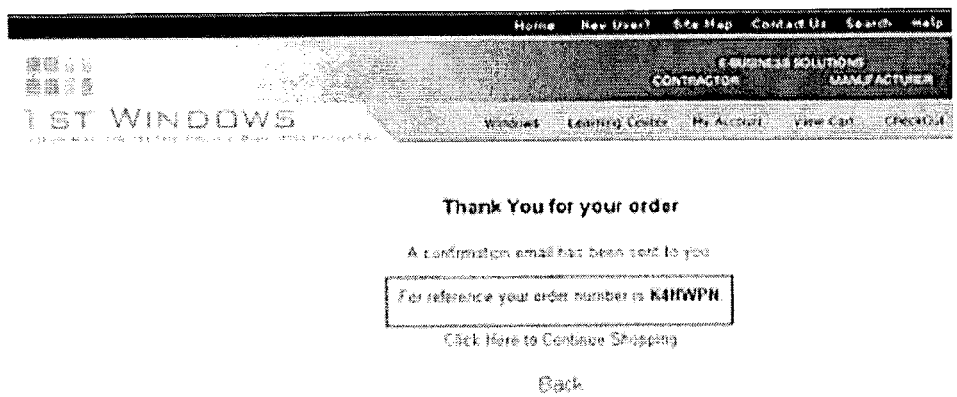
Figure 34:
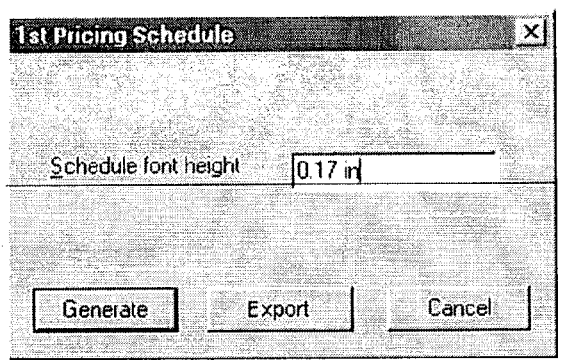
FIG. 34 shows an export function of a generated quote.

In the final step before placing an order, all the inputted information will be displayed and reviewed closely to insure correctness in a dialog as shown in FIG. 32. Once done, the "Submit Order" button is clicked or if changes are needed the "Change Fields" button is clicked. The billing address must match the billing address of the credit card to ensure a successful transaction. In this manner, the ordering process is completed. An order acknowledgment dialog as shown in FIG. 33 will display the order reference number and an email will be sent showing the contents of the order. A customer service representative will contact the user within 24 hours to verify all facets of the order. Once this step has been completed the order will be placed and the provided credit card will be charged.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

What is claimed:

1. An automated method for creating a price schedule for a construction project comprising:

(a) providing on a local computer a construction plan having at least one construction plan element, wherein the construction plan is created with a software design tool;

(b) using an add-on computer code that runs as an internal component within the software design tool on the local computer, providing on the local computer a palette including at least one parametric symbol, wherein each parametric symbol corresponds with one of the construction plan elements, and wherein the palette includes a parametric symbol for each of the construction plan elements;

(c) inserting the parametric symbols into the construction plan;

(d) using the add-on computer code, transmitting data corresponding to each of the inserted parametric symbols from the local computer over the Internet to a remote server system;

(e) using a zip code and the add-on computer code, accessing price data from a web site on the remote server system that includes price data for a purchase of the construction plan elements in a geographical location within the zip code;

(f) determining from the price data a price quote for each of the construction plan elements;

(g) using the add-on computer code, creating a price schedule from the price quotes, wherein the price schedule includes a total cost for all of the construction plan elements, and wherein the price schedule is used on the local computer to place an order to purchase one or more construction plan elements that are present in the price schedule; and (h) selecting a price quote and generating for the selected price quote a comparison of pricing between two or more manufacturers.

2. An automated system for creating a price schedule for a construction project comprising:

(a) a local computer;

(b) a software design tool, wherein the software design tool provides on the local computer a construction plan having at least one construction plan element;

(c) a remote server system that maintains a database including pricing data for the construction plan elements, wherein a connection exists between the remote server system and the local computer, and (d) an add-on computer code that runs as an internal component within the software design tool on the local computer;

wherein the add-on computer code has a palette that includes at least one parametric symbol that corresponds with each of the construction plan elements; and wherein the add-on computer code:

(i) inserts at least one of the parametric symbols into the construction plan;

(ii) transmits data corresponding to each inserted parametric symbol from the local computer over the Internet to a remote server system;

(iii) receives a price quote for each of the construction plan elements from the remote server system, wherein the price quotes may be determined using a zip code and price data that is present on a website on the remote server system and that includes prices for a purchase of the construction plan elements in a geographical location within the zip code;

(iv) generates a price schedule from the price quotes, wherein the price schedule includes a total cost for all of the construction plan elements, wherein the price schedule can include one or more construction plan elements, and wherein the price schedule can be used on the local computer to place an order to purchase one or more construction plan elements that are present in the price schedule; and (v) generates for a selected price quote a comparison of pricing between two or more manufacturers.

* * * * *